US007866731B2

(12) United States Patent
Oberheide et al.

(10) Patent No.: US 7,866,731 B2
(45) Date of Patent: Jan. 11, 2011

(54) POWER SLIDING DOOR HAVING A LINEAR DRIVE MECHANISM

(75) Inventors: G. Clarke Oberheide, Troy, MI (US); Bruce R. Cluney, Aurora (CA)

(73) Assignee: Magna Closures Inc., Newmarket (CA)

( * ) Notice: Subject to any disclaimer, the term of this patent is extended or adjusted under 35 U.S.C. 154(b) by 530 days.

(21) Appl. No.: 11/815,680

(22) PCT Filed: Feb. 20, 2006
(Under 37 CFR 1.47)

(86) PCT No.: PCT/CA2006/000255

§ 371 (c)(1),
(2), (4) Date: Feb. 5, 2008

(87) PCT Pub. No.: WO2006/086893

PCT Pub. Date: Aug. 24, 2006

(65) Prior Publication Data

US 2009/0300989 A1 Dec. 10, 2009

(51) Int. Cl.
*B60J 5/06* (2006.01)

(52) U.S. Cl. ........................................ 296/155; 49/360

(58) Field of Classification Search ................. 296/155; 49/360

See application file for complete search history.

(56) References Cited

U.S. PATENT DOCUMENTS 4,887,390 A * 12/1989 Boyko et al. .................. 49/214
4,932,715 A 6/1990 Kramer
5,083,472 A 1/1992 Kang
5,377,448 A 1/1995 Boyd et al.
5,606,826 A 3/1997 Calhoun
5,992,919 A * 11/1999 Menke ....................... 296/155
6,155,630 A 12/2000 Fukumoto et al.
6,367,864 B2 4/2002 Rogers et al.
6,481,783 B1 11/2002 Rogers, Jr. et al.
6,729,071 B1 5/2004 Kawanobe et al.
7,032,349 B2 * 4/2006 Oberheide et al. ............ 49/360
2002/0043818 A1 * 4/2002 Fukumoto et al. ........... 296/155

FOREIGN PATENT DOCUMENTS

KR 553518 B1 * 2/2006

OTHER PUBLICATIONS

Wikipedia, "Pulley", Sep. 14, 2010, pp. 1/5-5/5, http://en.wikipedia.org/wiki/Pulley.*

* cited by examiner

*Primary Examiner*—Dennis H Pedder
(74) *Attorney, Agent, or Firm*—Clark Hill P.L.C.

(57) ABSTRACT

A power operator assembly is provided for moving a sliding door between a sliding door of a motor vehicle between a closed position and an open position. The power operator assembly includes a guide rail fixedly secured to the motor vehicle and defining a rail length. A slide mechanism slidingly engages the guide rail. A drive is fixedly secured to the guide rail for selectively moving the slide mechanism along the guide rail in either direction. First and second cables each extend between the sliding door and the slide mechanism for moving the sliding door as the slide mechanism is driven along the guide rail. A compound pulley set is operatively connected to the drive and receives the first and second cables for powered movement of the sliding door a multiplied distance greater than the rail length as the slide mechanism is driven along the guide rail.

19 Claims, 6 Drawing Sheets

POWER SLIDING DOOR HAVING A LINEAR DRIVE MECHANISM

FIELD OF THE INVENTION

The invention relates to a power operator assembly for a sliding door of a motor vehicle. More particularly, the invention relates to a power operator assembly for power operation of a sliding door between a closed position and an open position.

DESCRIPTION OF RELATED ART

Certain motor vehicles, specifically vans, include a pair of front doors pivotally secured to a body portion, and a sliding door behind the pair of front doors for selectively closing a side opening. Typically, the sliding door includes upper, center, and lower rollers slidingly engaging respective upper, center, and lower curve-linear tracks along the body portion for movement between an open position and a closed position. Power operation of the sliding door between the open and closed positions has become a popular feature. Cables are commonly employed to pull the door open and closed due to a required long and curve-linear travel path of the door. Cables are driven by spooling drums of large size to store the required cable lengths. It would be desirable to employ a compact linear drive mechanism to operate a sliding door using cables but without cable drums to reduce size, weight, and complexity.

SUMMARY OF THE INVENTION

According to one aspect of the invention, a power operator assembly is provided for moving a sliding door of a motor vehicle between a closed position and an open position. The power operator assembly includes a guide rail fixedly secured to the motor vehicle and defining a rail length. A slide mechanism slidingly engages the guide rail. A drive is fixedly secured to the guide rail for selectively moving the slide mechanism along the guide rail in either direction. First and second cables each extend between the sliding door and the slide mechanism for moving the sliding door as the slide mechanism is driven along the guide rail. A compound pulley set is operatively connected to the drive and receives the first and second cables at least partially therearound for powered movement of the sliding door a multiplied distance greater than the rail length as the slide mechanism is driven along the guide rail.

According to another aspect of the invention, a power operating assembly moves a sliding door between an open position and a closed position. The power operating assembly includes a guide rail fixedly secured to the motor vehicle. A slide mechanism slidably engages the guide rail. A drive is fixedly secured to the guide rail for powering movement of the slide mechanism along the guide rail. First and second cables extend between the sliding door and the slide mechanism for moving the sliding door as the slide mechanism is driven along the guide rail. A compound pulley set is operatively connected to each of the first and second cables and the drive. The compound pulley set receives the first and second cables at least partially therearound for powered movement of the sliding door as the slide mechanism is driven along the guide rail. A decoupling mechanism is coupled to the guide rail for selectively decoupling the slide mechanism from the drive to allow manual movement of the sliding door between the open position and the closed position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
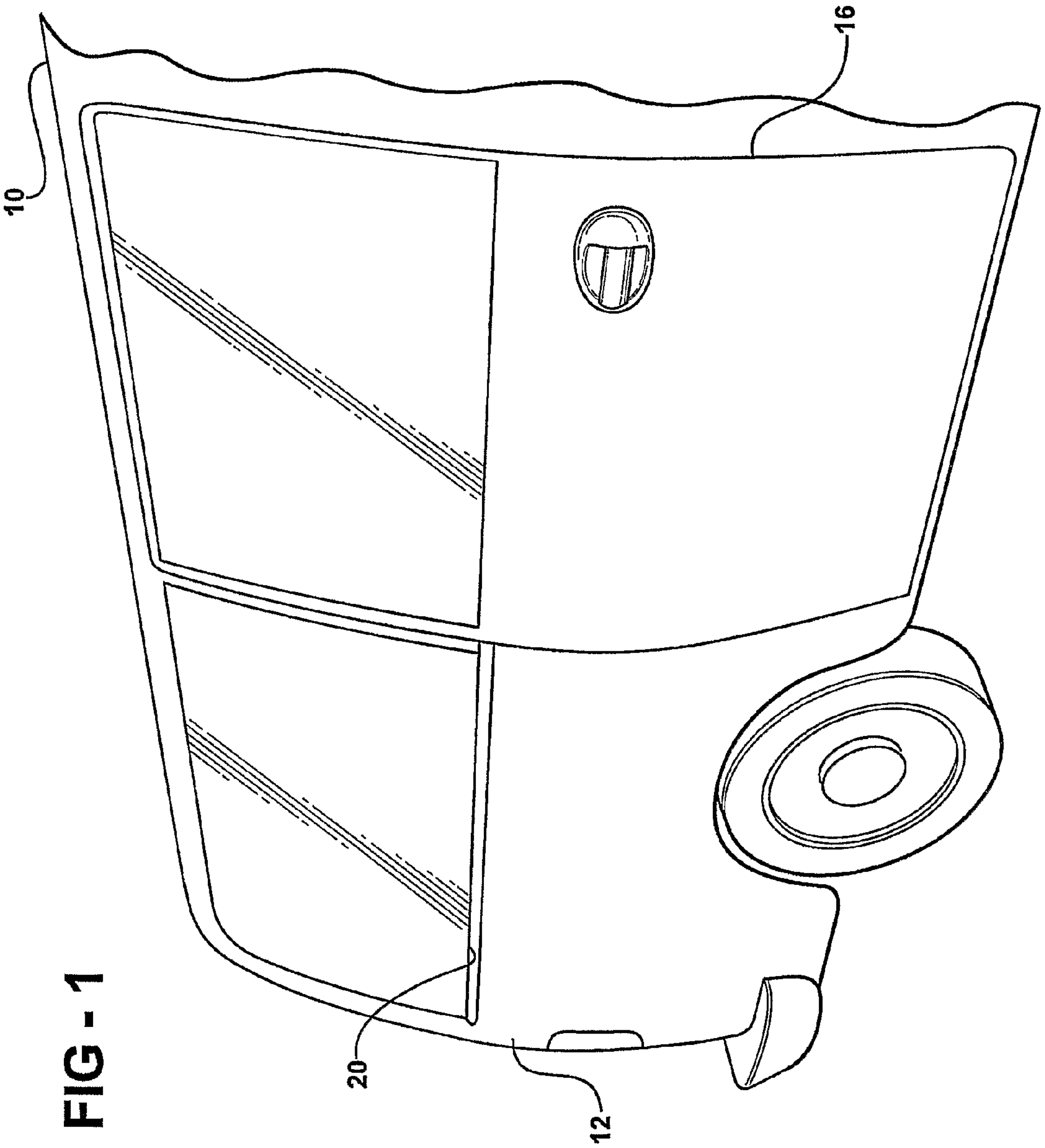
FIG. 1 is a fragmentary, perspective view of a motor vehicle including a rear quarter panel, and a sliding door in a closed position.
Figure 2:
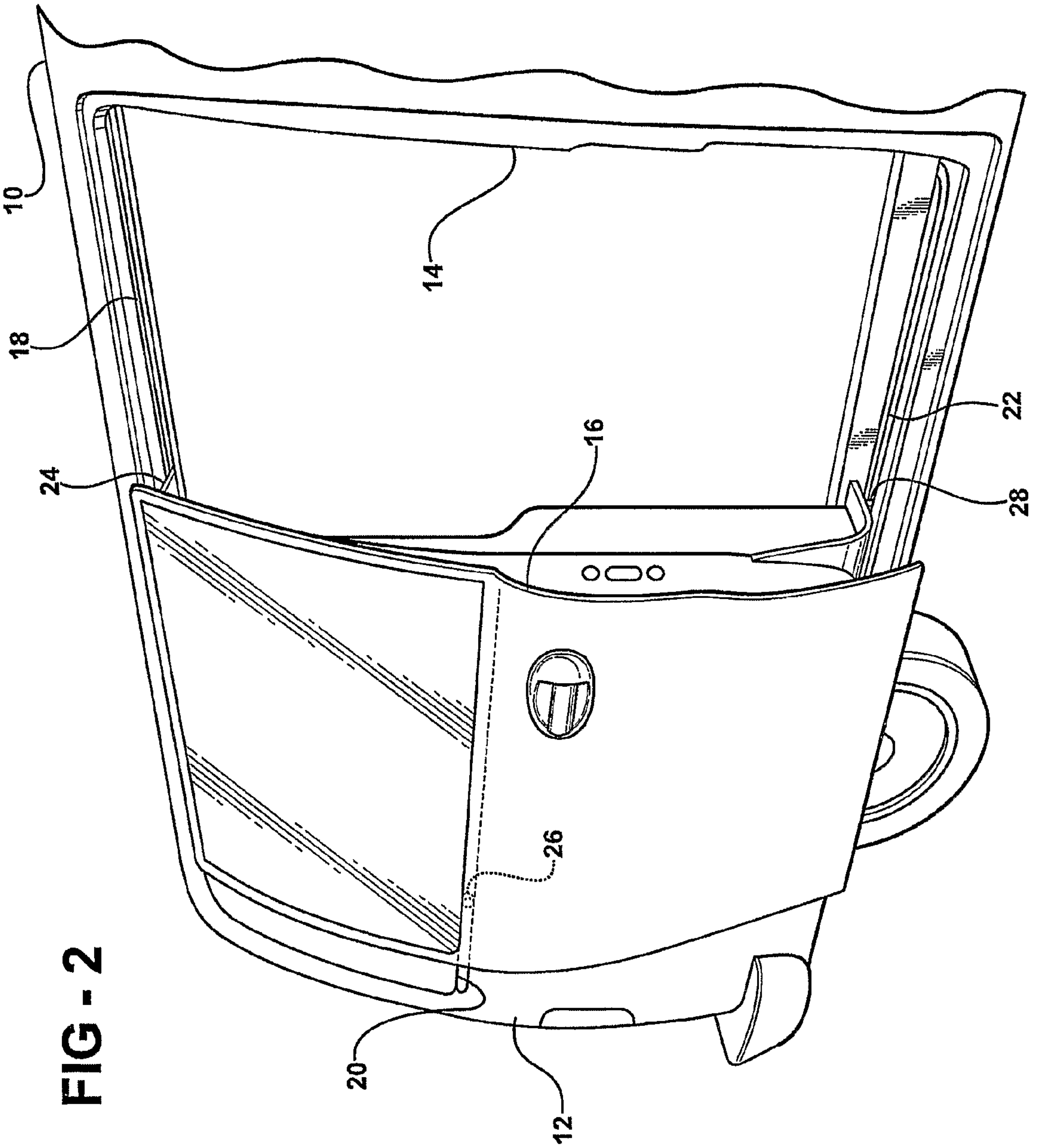
FIG. 2 is a fragmentary, perspective view of the motor vehicle including the sliding door in an open position.

Referring to FIGS. 1 and 2, a motor vehicle 10 includes a rear quarter body panel 12 partially defining a side opening 14. A sliding door 16 is coupled to the motor vehicle 10 and moves between a closed position covering the side opening 14, shown in FIG. 1, and an open position, shown in FIG. 2. The curve-linear path of travel of the sliding door 16 is defined by an upper track 18, a center track 20, and a lower track 22. The sliding door 16 includes an upper hinge member 24, a center hinge member 26, and a lower hinge member 28 slidably engaging the upper track 18, center track 20, and lower track 22, respectively, for movement between the closed position and the open position.

Figure 3:
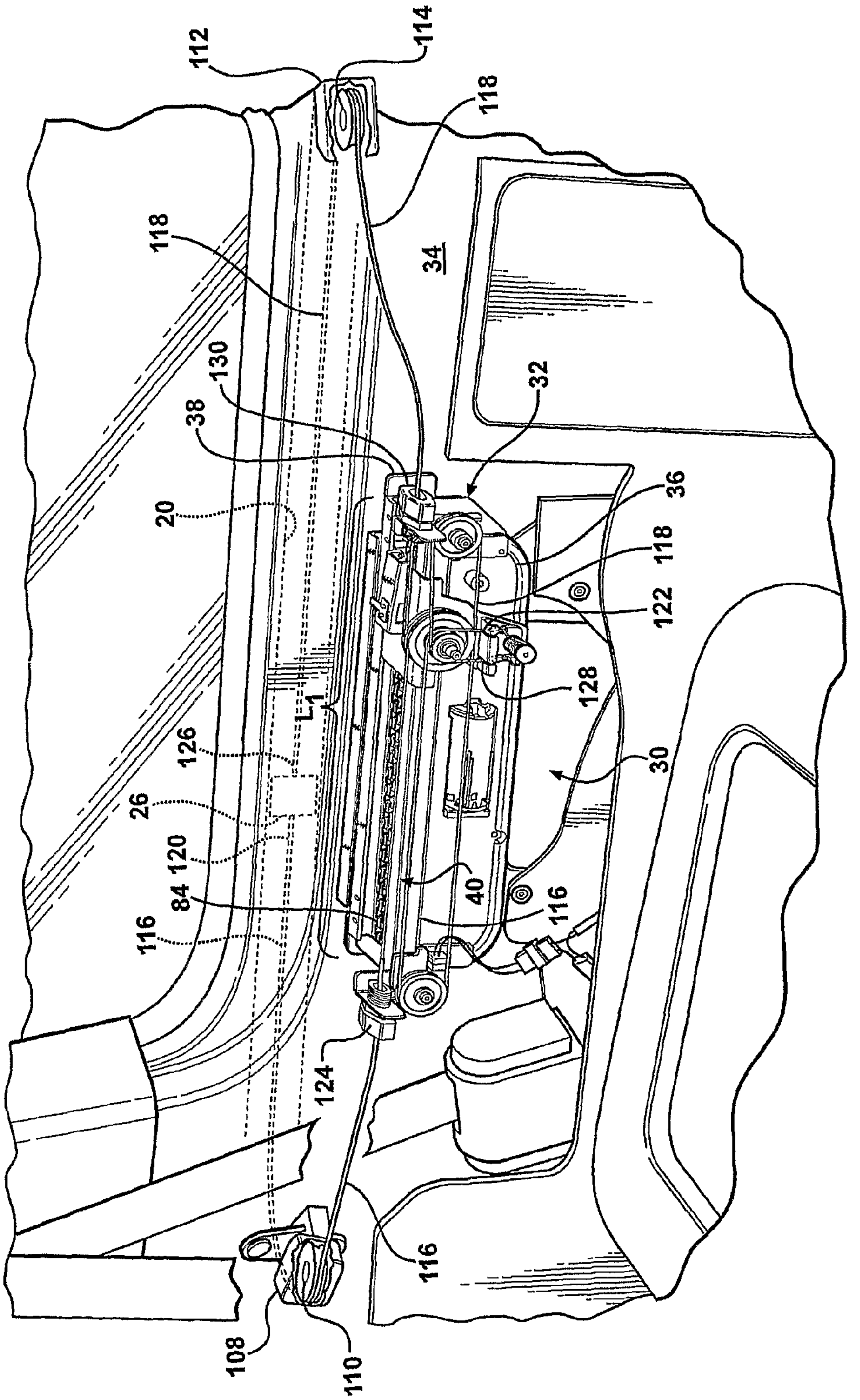
FIG. 3 is a fragmentary, perspective view of an inboard surface of the rear quarter panel including a power operator assembly according to the invention fixedly mounted thereto for moving the sliding door between the closed and open positions.

Referring to FIG. 3, a power operator assembly, generally shown at 30, includes a housing, generally indicated at 32, fixedly mounted to an inboard surface 34 of the rear quarter body panel 12. The housing 32 includes an inner plate 36, and an outer plate 38 fixedly secured to and abutting the inboard surface 34.

Figure 4:
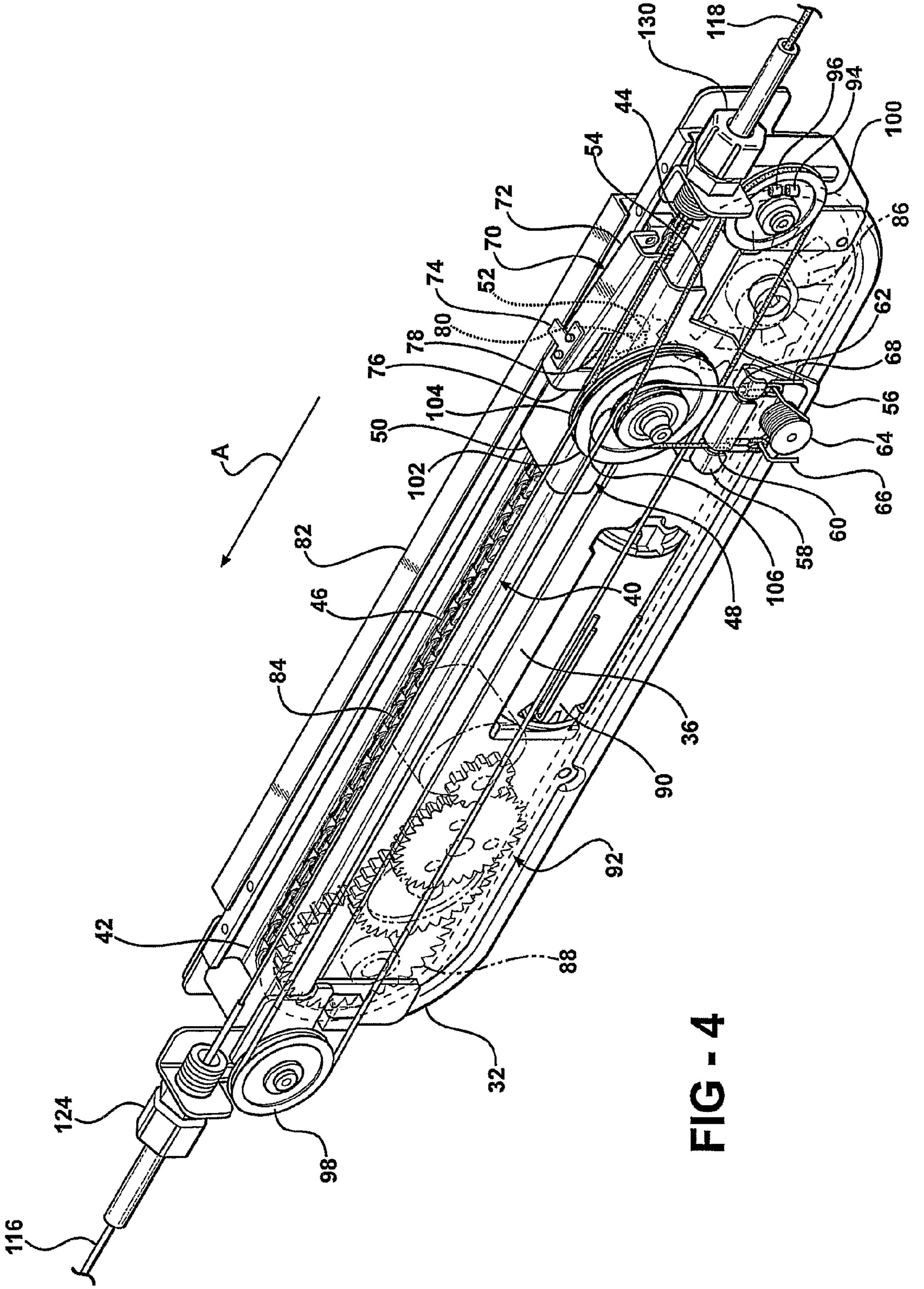
FIG. 4 is a fragmentary, perspective view of the power operator assembly including a central pulley adjacent a back end of a guide rail while the sliding door is in the closed position.
Figure 5:
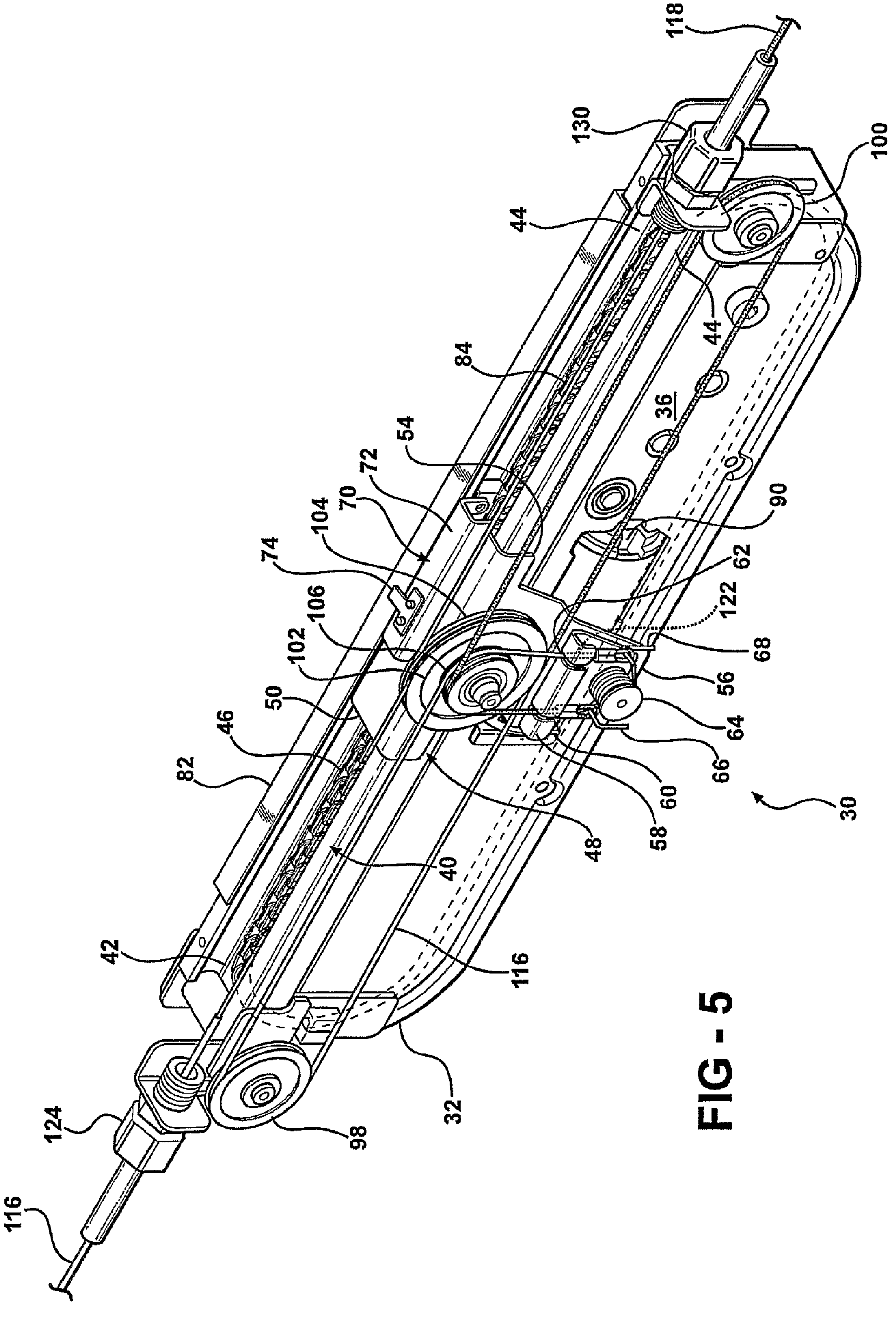
FIG. 5 is a fragmentary, perspective view of the power operator assembly including the central pulley disposed between a front end of the guide rail and the back end thereof as the sliding door is moving between the closed and open positions.
Figure 6:
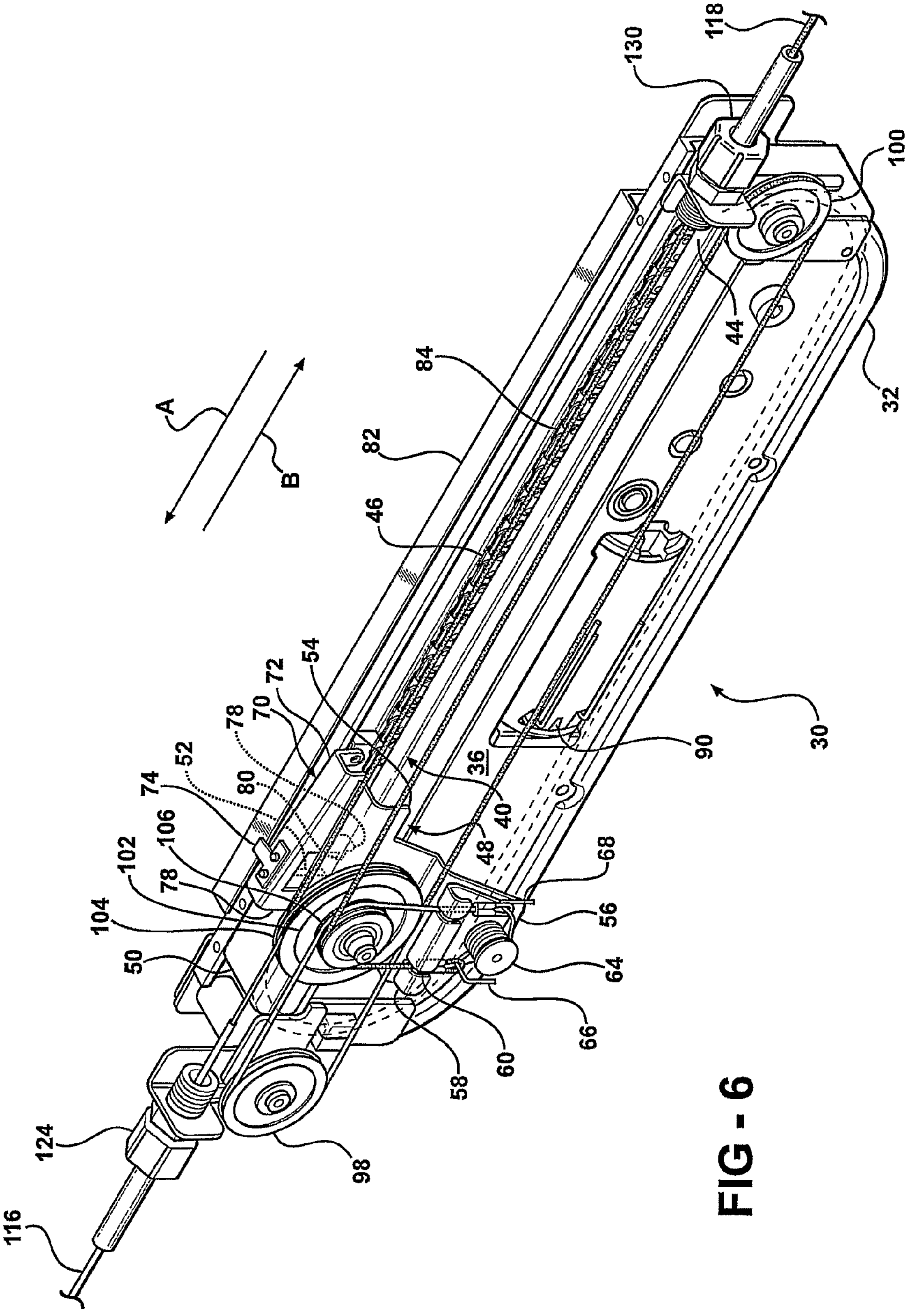
FIG. 6 is a perspective view of the power operator assembly including the central pulley adjacent the front end of the guide rail while the sliding door is in the open position.

The power operator assembly 30 includes a guide rail, generally indicated at 40, at least partially disposed within an interior of the housing 32. The guide rail 40 defines a rail length $L_1$. Referring to FIGS. 4 through 6, the guide rail 40 includes a front end 42, a back end 44, and a channel 46 extending between the front 42 and back 44 ends. Preferably, the channel 46 extends along the entire rail length $L_1$.

A slide mechanism, generally indicated at 48, slidingly engages the guide rail 40 for movement between the front 42 and back 44 ends thereof. The slide mechanism 48 is operably connected to the sliding door 16 such that movement of the slide mechanism 48 between the front 42 and back 44 ends of the guide rail 40 moves the sliding door 16 between the respective open and closed positions. The slide mechanism 48 includes a generally horizontal segment 50 having a central engagement bracket 52 extending into the channel 46. A vertical segment 54 of the slide mechanism 48 extends downwards from the horizontal segment 50 along the exterior of the inner plate 36 of the housing 32. The vertical segment 54 terminates at a distal edge 56.

A slide bracket 58 is fixedly mounted to the vertical segment 54 of the slide mechanism 48 adjacent the distal edge 56. The slide bracket 58 defines first 60 and second 62 slots. A tensioner 64 is fixedly secured to the slide bracket 58 below the first 60 and second 62 slots to provide cable tension. The tensioner 64 includes a pair of arms 66, 68.

A clasp, generally indicated at 70, is pivotally hinged to the horizontal segment 50 of the slide mechanism 48. The clasp 70 includes a body portion 72, and an arm 74 resiliently coupled to the body portion 72 and extending out therefrom. The clasp 70 also includes first 76 and second 78 locking fingers extending out from the body portion 72. Each of the first 76 and second 78 locking fingers includes a lock tab 80. The clasp 70 pivots between an unlock position, shown in FIGS. 4 and 6, and a lock position, shown in FIG. 5, wherein the arm 74 of the clasp 70 is parallel to the horizontal segment 50 of the slide mechanism 48. In the unlock position, the first locking finger 76 is pivoted away from the central engagement bracket 52. And in the lock position, the first locking finger 76 closes around the central engagement bracket 52.

The power operator assembly 30 further includes a decoupling mechanism 82 operably coupled to the slide mechanism 48. Preferably, the decoupling mechanism 82 is an elongated ramp disposed alongside at least a portion of the length $L_1$ of the guide rail 40. A motor (not shown) is provided for moving the elongated ramp 82 between a raised position, shown in FIGS. 4 and 6, and a lowered position, shown in FIG. 5. In the raised position, the elongated ramp 82 holds up the arm 74 of the clasp 70 in order to maintain the clasp 70 in the unlock position. When the elongated ramp 82 is in the lowered position, the arm 74 drops down and the clasp 70 moves into the lock position. It is contemplated that although the decoupling mechanism 82 is shown and described as an elongated ramp, the decoupling mechanism 82 may be any of various structures or devices.

A drive 84 is partially disposed within the channel 46 of the guide rail 40 to selectively drive the slide mechanism 48 between the front 42 and back 44 ends of the guide rail 40 for powered movement of the sliding door 16 between its respective open and closed positions. In a preferred embodiment, the drive 84 is a flexible chain that is formed in a continuous loop. A portion of the chain 84 enters the channel 46 at the front end 42 of the guide rail 40 and exits the channel 46 at the back end 44 of the guide rail 40. Although the drive 84 is a chain in the preferred embodiment, it is appreciated that the drive 84 may be a belt, tape, cable, lead screw, hydraulically-actuated cylinder, or the like.

An idler sprocket 86 and a drive sprocket 88, shown in FIG. 4, are disposed adjacent the respective front 42 and back 44 ends of the guide rail 40. The chain 84 wraps around a portion of each of the idler 86 and drive 88 sprockets. A reversible motor 90 drives the drive sprocket 88 into clockwise and counterclockwise rotation via a gear assembly, generally indicated at 92.

The chain 84 includes a drive lug 94 that engages the central engagement bracket 52 of the slide mechanism 40 as the chain 84 is driven by the motor 90. The drive lug 94 includes a recess 96 that is engaged by the lock tab 80 of the first locking finger 76 to interlock the chain 84 to the clasp 70. The drive lug 94 resets to a park position when it is not in engagement with the central engagement bracket 52.

The power operator assembly 30 also includes a compound pulley set 98, 100, 102. The compound pulley set includes a fixed front pulley 98 disposed adjacent the front end 42 of the guide rail 40, and a fixed back pulley 100 disposed adjacent the back end 44 of the guide rail 40. The compound pulley also includes a central pulley 102 fixedly secured to the vertical segment 54 of the slide mechanism 48 above the slide bracket 72. The central pulley 102 includes a large diameter groove 104 and a smaller diameter groove 106.

Referring back to FIG. 3, a front bracket 108 is fixedly mounted along the inboard surface 34 of the rear quarter panel 12 forward of the front end 42 of the guide rail 40. A front guide pulley 110 is disposed along the front bracket 108. A rear bracket 112 is fixedly mounted along the inboard surface 34 of the rear quarter panel 12 rearward of the back end 44 of the guide rail 40. A rear guide pulley 114 is disposed along the rear bracket 112.

The power operator assembly 30 further includes first 116 and second 118 cables generally extending between the slide mechanism 48 and the center hinge member 26 of the sliding door 16 for coupling the slide mechanism 48 thereto. The first cable 116 extends between a track end 120, which is secured to the center hinge member 26 that runs along the center track 20, and a slide end 122, which is secured to the slide mechanism 48. More specifically, the first cable 116 extends out from the center hinge member 26, through the rear quarter body panel 12, around the front guide pulley 110, and is received by the front cable guide 124 disposed adjacent the front end 42 of the guide rail 40. The first cable 116 extends through the front cable guide 124, around a portion of the large diameter groove 104 of the central pulley 102, around a portion of the fixed front pulley 98, back around the small diameter groove 106 of the central pulley 102, and through the second slot 62 of the slide bracket 58, where it is coupled at its slide end 122 to one of the arms 68 of the tensioner 64, which provides cable tension to the first cable 116.

The second cable 118 extends between a track end 126, which is secured to the center hinge member 26 that runs along the center track 20, and a slide end 128, which is secured to the slide mechanism 48. More specifically, the second cable 118 extends out from the center hinge member 26, through the rear quarter body panel 12, around the rear guide pulley 114, and is received by the rear cable guide 130 disposed adjacent the back end 44 of the guide rail 40. The second cable 118 extends through the rear cable guide 130, around a portion of the large diameter groove 104 of the central pulley 102, around a portion of the fixed back pulley 100, around the small diameter groove 106 of the central pulley 102, and through the first slot 60 of the slide bracket 58, where it is coupled at its slide end 128 to one of the arms 66 of the tensioner 64 in order to provide cable tension to the second cable 118.

The compound pulley set, including the fixed front pulley 98, the fixed back pulley 100, and the central pulley 102, moves the sliding door 16 a multiplied distance greater than the rail length $L_1$. More specifically, the sliding door 16 is moved a distance approximately three times the rail length $L_1$ as the compound pulley set in this embodiment includes three passes of the cables 116, 118 between moving pulleys.

In operation, starting with the sliding door 16 in the closed position (see FIG. 1) and the slide mechanism 48 at the back end 44 of the guide rail 40, as shown in FIG. 4, the motor 90 is activated to drive the chain 84 in the direction of arrow A. At the same time, the elongated ramp 82 moves into its lowered position. As a result, the arm 74 of the clasp 70 drops downwards to move the clasp 70 into the locked position. More specifically, the first locking finger 76 of the clasp 70 closes around the central engagement bracket 52. The drive lug 94, which moves with the chain 84 in the direction of arrow A, moves into engagement between the first locking finger 76 and the central engagement bracket 52. As a result, the slide mechanism 48 and the chain 84 are coupled to one another. As the coupled slide mechanism 48 and chain 84 move towards the front end 42 of the guide rail 40, as shown in FIG. 5, the second cable 118 is taken up by the central pulley 102 and the first cable 116 unwinds, thereby initiating movement of the sliding door 16 out of the closed position and towards the open position. When the slide mechanism 48 reaches the front end 42 of the guide rail 40, as shown in FIG. 6, the sliding door 16 is in the open position, shown in FIG. 2. At this time, the elongated ramp 82 moves into the raised position to lift the arm 74 of the clasp 70. As a result, the clasp 70 and the drive lug 94 are decoupled. The chain 84 then is driven relative to the slide mechanism 48 to move the drive lug 94 to its park position.

To return the sliding door 16 to the closed position via power operation, the motor 90 is activated to drive the chain 84 out of the park position in the direction of arrow A, shown in FIG. 6. At the same time, the elongated ramp 82 moves into its lowered position. As a result, the arm 74 of the clasp 70 drops downwards moving the clasp 70 into the locked position. More specifically, the first locking finger 76 of the clasp 70 closes around the central engagement bracket 52. The drive lug 94, which moves with the chain 84 in the direction of arrow A becomes engaged between the first locking finger 76 and the central engagement bracket 52. As a result, the slide mechanism 48 and the chain 84 are coupled to one another. The motor 90 then reverses such that the coupled slide mechanism 48 and chain 84 move in the direction of arrow B, towards the back end 44 of the guide rail 40. As the coupled slide mechanism 48 and chain 84 move towards the back end 44 of the guide rail 40, the first cable 116 is taken up by the central pulley 102 while the second cable 118 unwinds, thereby initiating movement of the sliding door 16 out of the open position and towards the closed position. When the slide mechanism 48 reaches the back end 44 of the guide rail 40, the sliding door 16 is in the closed position. At this time, the elongated ramp 82 is moved into the raised position such that the clasp 70 and the drive lug 94 are decoupled. The drive lug 94 then returns to its park position.

Although the slide mechanism 48 only travels approximately 300 mm between the front 42 and back 44 ends of the guide rail 40, the particular configuration of the compound pulley set, that is, the fixed front pulley 98, the fixed rear pulley 100, and the central pulley 102, combined with the path of travel of the first 116 and second 118 cables provides for approximately 900 mm of sliding door travel between its closed and open positions. Thus, the distance traveled by the sliding door 16 is approximately three times the distance traveled by the slide mechanism 48. It is appreciated that although the fixed front pulley 98, the fixed rear pulley 100, and the central pulley 102 are shown and described at particular locations, the exact positioning of each of these pulleys 98, 100, 102 may vary in any of numerous ways.

Finally, when the sliding door 16 is in either of the closed and open positions, manual operation of the sliding door 16 may be effected without interfering with the powered operation. This is due the fact that when the sliding door 16 is in the closed or open positions, the slide mechanism 48 and the chain 84 are decoupled. As a result, manual operation of the sliding door 16 will move only the slide mechanism 48 between the front 42 and back 44 ends of the guide rail 40; the chain 84 remains stationary.

The compound pulley set 98, 100, 102 stores the first 116 and second 118 cables taken up within. Under power operation, the compound pulley moving further apart and paying in cable applies a sufficient cable tension to cause the door movement while the compound pulley set moving closer together pays out an equal amount of cable at a lighter and provided tension when positive work is one the door. When not under power operation, the chain 84 does not engage the slide mechanism 48 in order to allow manual operation of the sliding door 16 with the first 116 and second 118 cables from the sliding door 16 respectively backdriving slide mechanism movement at low effort. The size and complexity of the power operator assembly 30 that is required to open and close a long and curve-linear path sliding door is reduced by amplifying the drive travel length through pulley compounding of cables and by providing an inherent storage of long cables through multiple passes along its linear form.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A power operator assembly for moving a sliding door of a motor vehicle between an open position and a closed position, said power operator assembly comprising:

a guide rail fixedly secured to the motor vehicle and defining a rail length;

a slide mechanism slidably engaging said guide rail;

a drive fixedly secured to said guide rail for selectively moving said slide mechanism along said guide rail;

first and second cables each extending between the sliding door and said slide mechanism for moving the sliding door as said slide mechanism is driven along said guide rail; and a compound pulley set operatively connected to said drive and receiving said first and second cables at least partially therearound for powered movement of the sliding door a multiplied distance greater than said rail length as said slide mechanism is driven along said guide rail.

2. A power operator assembly as set forth in claim 1 wherein said compound pulley set includes a central pulley fixedly secured to said slide mechanism and receiving a portion of each of said first and second cables therearound.

3. A power operator assembly as set forth in claim 2 wherein said compound pulley set includes a fixed front pulley disposed along said guide rail and spanned by said first cable.

4. A power operator assembly as set forth in claim 3 wherein said compound pulley set includes a fixed back pulley disposed along said guide rail and spanned by said second cable.

5. A power operator assembly as set forth in claim 4 wherein said central pulley includes a large diameter groove and a smaller diameter groove.

6. A power operator assembly as set forth in claim 5 including a tensioner fixedly secured to said slide mechanism and coupled to each of said first and second cables for providing cable tension thereto.

7. A power operator assembly as set forth in claim 6 including a reversible motor operatively connected to said drive for moving said drive in opposing directions along said guide rail.

8. A power operator assembly as set forth in claim 1 wherein said slide mechanism includes a clasp operatively coupled to said slide mechanism for selectively coupling said drive to said slide mechanism.

9. A power operator assembly as set forth in claim 8 wherein said drive is a flexible chain formed in a continuous loop.

10. A power operator assembly as set forth in claim 9 wherein including a decoupling mechanism coupled to said guide rail for selectively decoupling said slide mechanism from said drive to allow manual movement of the sliding door between the open position and closed position.

11. A power operator assembly for moving a sliding door of a motor vehicle between an open position and a closed position, said power operator assembly comprising:

a guide rail fixedly secured to the motor vehicle;

a slide mechanism slidably engaging said guide rail;

a drive fixedly secured to said guide rail for powering movement of said slide mechanism along said guide rail;

first and second cables each extending between the sliding door and said slide mechanism for moving the sliding door as said slide mechanism is driven along said guide rail;

a compound pulley set operatively connected to each of said first and second cables and said drive, said compound pulley set receiving said first and second cables at least partially therearound for powered movement of the sliding door as said slide mechanism is driven along said guide rail; and a decoupling mechanism coupled to said guide rail for selectively decoupling said slide mechanism from said drive to allow manual movement of the sliding door between the open position and closed position.

12. A power operator assembly as set forth in claim 11 wherein said compound pulley set includes a central pulley fixedly secured to said slide mechanism and receiving a portion of each of said first and second cables therearound.

13. A power operator assembly as set forth in claim 12 wherein said compound pulley set includes a fixed front pulley disposed along said guide rail and spanned by said first cable.

14. A power operator assembly as set forth in claim 13 wherein said compound pulley set includes a fixed back pulley disposed along said guide rail and spanned by said second cable.

15. A power operator assembly as set forth in claim 14 wherein said central pulley includes a large diameter groove and a smaller diameter groove.

16. A power operator assembly as set forth in claim 15 including a tensioner fixedly secured to said slide mechanism and coupled to each of said first and second cables for providing cable tension thereto.

17. A power operator assembly as set forth in claim 11 wherein said slide mechanism includes a clasp operatively coupled to said slide mechanism for selectively coupling said drive to said slide mechanism.

18. A power operator assembly as set forth in claim 17 including a drive lug fixedly secured to said drive and engageable with said clasp to drive said slide mechanism along said guide rail.

19. A power operator assembly as set forth in claim 18 wherein said clasp includes at least one locking finger for locking said slide mechanism into coupling engagement with said drive.

* * * * *